(12) United States Patent
Ohhata et al.

(10) Patent No.: US 7,777,903 B2
(45) Date of Patent: Aug. 17, 2010

(54) DATA TRANSMISSION APPARATUS

(75) Inventors: Akira Ohhata, Hoi-gun (JP); Youichi Kurumasa, Toyokawa (JP); Takuya Okada, Toyokawa (JP); Toshihisa Motosugi, Okazaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1639 days.

(21) Appl. No.: 11/004,079

(22) Filed: Dec. 6, 2004

(65) Prior Publication Data

US 2006/0044621 A1    Mar. 2, 2006

(30) Foreign Application Priority Data

Sep. 1, 2004   (JP) .............................. 2004-254162

(51) Int. Cl.
    *G06F 1/04*    (2006.01)
(52) U.S. Cl. .................. 358/1.15; 358/438; 358/434; 358/440; 379/100.01; 379/224; 709/204; 714/699
(58) Field of Classification Search .............. 358/438, 358/434, 400, 1.15, 1.1, 440, 439, 404; 705/14, 705/1; 379/100.01, 224, 204, 223; 709/204, 709/88.03; 714/699
See application file for complete search history.

(56) References Cited

U.S. PATENT DOCUMENTS

| | | | | |
|---|---|---|---|---|
| 6,122,671 | A * | 9/2000 | Farrar et al. ................. 709/238 |
| 6,564,217 | B2 * | 5/2003 | Bunney et al. ................. 707/10 |
| 6,801,955 | B2 * | 10/2004 | Dunlap et al. ................. 710/8 |
| 6,879,411 | B1 * | 4/2005 | Otsuka et al. .............. 358/1.15 |
| 6,985,242 | B1 * | 1/2006 | Toyoda ....................... 358/1.15 |
| 7,000,157 | B2 * | 2/2006 | Okamoto et al. ............ 714/712 |
| 7,019,853 | B1 * | 3/2006 | Maeda ....................... 358/1.15 |
| 7,029,853 | B1 * | 4/2006 | Rastogi et al. ................. 435/6 |
| 7,245,391 | B2 * | 7/2007 | Nishimura ................. 358/1.15 |
| 7,328,258 | B2 * | 2/2008 | Koide et al. ................. 709/223 |
| 7,330,280 | B2 * | 2/2008 | Kanazawa ................. 358/1.13 |
| 7,535,587 | B2 * | 5/2009 | Shinomiya ................. 358/1.15 |
| 7,640,310 | B2 * | 12/2009 | Iida ............................ 709/206 |
| 2002/0032607 | A1 * | 3/2002 | Kuwahara ..................... 705/14 |
| 2002/0144026 | A1 * | 10/2002 | Dunlap et al. ................. 710/16 |

(Continued)

FOREIGN PATENT DOCUMENTS

JP    6-311291    11/1994

(Continued)

OTHER PUBLICATIONS

Notification of Reasons of Refusal issued Mar. 7, 2006.

(Continued)

*Primary Examiner*—Negussie Worku
(74) *Attorney, Agent, or Firm*—Buchanan Ingersoll & Rooney PC

(57) ABSTRACT

In data transmission apparatus, a transmission device transmits data to a destination when a user instructs data transmission. A storage device stores user information to relate destinations to users. The apparatus can communicate with a server having destination information. When the user logs in, automatic retrieval is requested to the server to retrieve a destination related to the user in the user information in the storage device. A result of retrieval executed by the server is received and stored in the storage device.

19 Claims, 8 Drawing Sheets

U.S. PATENT DOCUMENTS

| | | | |
|---|---|---|---|
| 2002/0194553 A1* | 12/2002 | Okamoto et al. | 714/699 |
| 2003/0128387 A1* | 7/2003 | Noda | 358/1.15 |
| 2003/0128824 A1* | 7/2003 | Kotsuki | 379/100.01 |
| 2004/0024811 A1 | 2/2004 | Kitada et al. | |
| 2005/0097171 A1* | 5/2005 | Hikichi | 709/204 |
| 2005/0188014 A1* | 8/2005 | Kawamoto et al. | 709/204 |
| 2005/0192945 A1* | 9/2005 | Motosugi et al. | 707/3 |
| 2007/0019227 A1* | 1/2007 | Hibino et al. | 358/1.15 |

FOREIGN PATENT DOCUMENTS

| | | |
|---|---|---|
| JP | 11-215291 | 8/1999 |
| JP | 2001-249882 | 9/2001 |
| JP | 2002-232663 | 8/2002 |
| JP | 2004-112798 | 4/2004 |

OTHER PUBLICATIONS

Notification of Reasons of Refusal with English translation dated May 30, 2006.

* cited by examiner

DATA TRANSMISSION APPARATUS

This application is based on application No. 2004-254162 filed in Japan, the contents of which are hereby incorporated by reference.

BACKGROUND OF THE INVENTION

The invention relates to data transmission through a network with a data transmission apparatus having keys for designating a destination.

In a network environment, a data transmission apparatus such as a personal computer or a network device such as a facsimile apparatus can send data of a document or an image as an internet fax or directly to another personal computer or the like. When such data is sent attached to an electronic mail (or e-mail), it is necessary to describe an e-mail address for the destination. However, an operation for inputting an e-mail address with an operation panel or the like is bothersome, and an e-mail may not be delivered due to an erroneous input of the e-mail address.

A one-touch dial is used widely for a facsimile apparatus or the like. Once a telephone number (facsimile number) is registered manually at a one-touch dial, the telephone number can be inputted with one operation by using the one-touch dial (for example Japanese Patent laid open Publication 11-68914/1999), Thus, the procedure for setting the destination is simplified, and this relieves the bothersome manual input operation.

Further, it is known to provide a table for registering destination information in an external server, which a personal computer or a network device accesses to retrieve and set a desired destination as a destination for a transmission. For example, in a facsimile system described in Japanese Patent laid open Publication H11-215291/1999, destination information is stored in a telephone directory provided in a computer connected to the facsimile system. An address is retrieved in the telephone directory including a name of an addressee, a facsimile number thereof and an e-mail address thereof. When characters to be retrieved are inputted and a retrieve key is pressed by a user in the facsimile apparatus, the result of retrieval is presented in a liquid crystal display device. If the information is captured into the facsimile apparatus, the transmission to the addressee can be performed easily. However, it takes a long time for a user to access the telephone directory to designate a destination for each transmission.

Further, when destination information such as an e-mail address or a facsimile number is changed but the change is not reflected in the table for registering the destination information, a transmission may happen to be sent erroneously to the old address. Then, it is proposed to update the destination information periodically. In a network system shown in Japanese Patent laid open Publication 2001-249882, destinations of all the devices including for example a server and a multi-functional peripheral stored in a table are updated for example periodically. In a network shown in Japanese Patent laid open Publication 2002-232663, a database of one-touch abbreviated group dialing information is provided in a database server. A user of a personal computer can access the database in order to register, change or delete a one-touch abbreviated group dialing information. Each time the database is accessed, the database information is updated, and the facsimile apparatus accesses the database, for example, periodically to update the information registered to the one-touch buttons provided in the facsimile apparatus.

However, in a facsimile apparatus using the information registered to the one-touch keys in the database server which is updated periodically, a transmission to an old address for a one-touch key may happen when the destination information was changed but not yet registered to the one-touch key. On the other hand, if the update interval is shortened, a traffic in the network is increased.

SUMMARY OF THE INVENTION

An object of the invention is to make it easy to update the information registered to a destination register key in a data transmission apparatus at the latest status.

In one aspect of the invention, a data transmission apparatus comprises a transmission device which transmits data to a destination when a user's instruction for data transmission is received, an input device with which a user inputs the destination, and a storage device which stores user information wherein destinations are related to users. A server can to communicate with the data transmission apparatus and has destination information, When the user logs in, an automatic retrieval device requests the server to retrieve a destination related to a user in the user information in the storage device, receives a result of retrieval executed by the server and stores the result in the storage device.

In a data transmission system, the above-mentioned data transmission apparatus is connected through a network to the server. The server comprises a database to which information including destination information is registered, a retrieval device which retrieves the information according to retrieval conditions; and a communication device which sends a result of the retrieval obtained by the retrieval device to the data transmission apparatus.

An advantage of the invention is that a time needed for retrieval can be shortened by retrieving only the destination information of the key to which a destination is registered so that a response of the data transmission apparatus is improved while keeping the destination information at the latest status.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
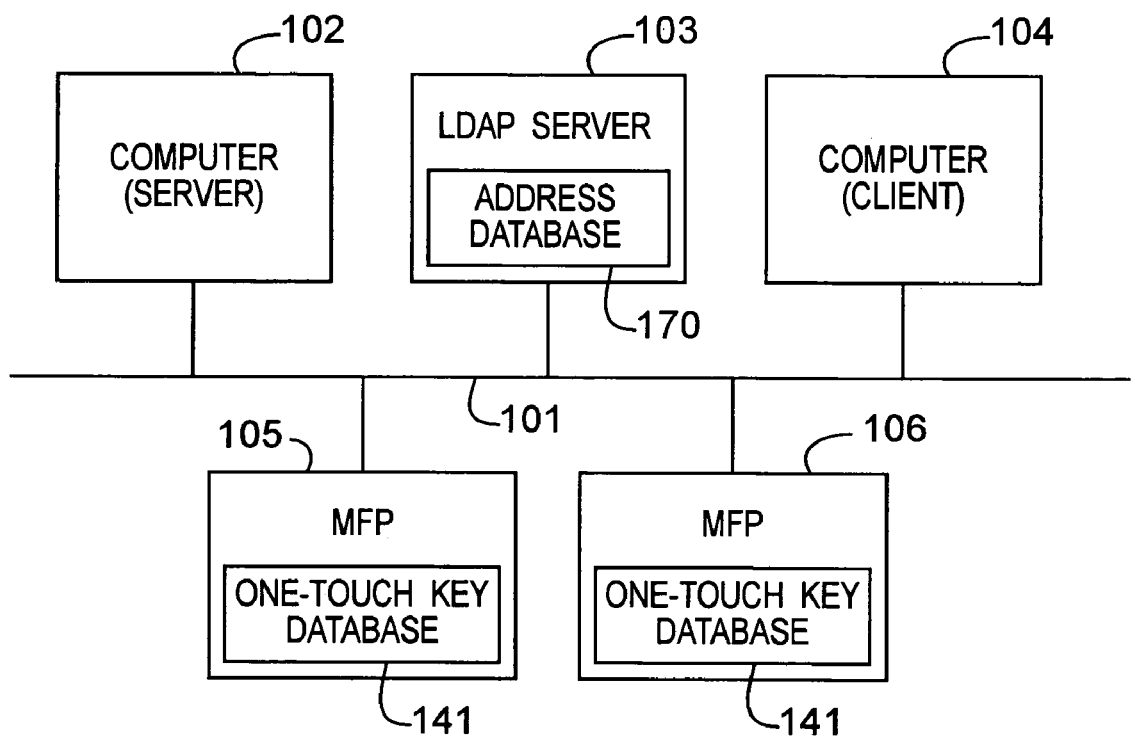
FIG. 1 is a diagram of a network system.

Referring now to the drawings, wherein like reference characters designate like or corresponding parts throughout the several views, FIG. 1 shows a network system wherein many network devices 102 to 106 are connected to a network 101. A computer 102 is a server computer. A lightweight access protocol (LDAP) server 103 is an example of a server for registering and retrieving destination information in the network. The LDAP server 103 stores names of persons, groups and the like, e-mail addresses, telephone numbers, facsimile numbers, company names and the like. A computer 104 such as a personal computer (CP) is a client computer. Further, various network devices are connected to the network 101. For example, multi-functional peripherals (hereinafter referred to as MFP) 105, 106 are examples of apparatuses for transmitting image or document data to a destination in the network 101, and in this embodiment. The MFP 105, 106 has many functions, and it can be operated as a scanner, a facsimile apparatus, a printer, a copying machine or the like. Image or document data received from an external apparatus, read by the scanner function, received from an external apparatus (not shown) or stored inside the MFP can be transmitted through the network 101 to a destination in the network. It is to be noted that server computers, client computers and data transmission apparatuses are not limited to the examples shown in FIG. 1. Further, the types and the numbers of the data transmission apparatus and the data retrieval apparatus are not limited to the examples shown in FIG. 1.

Figure 2:
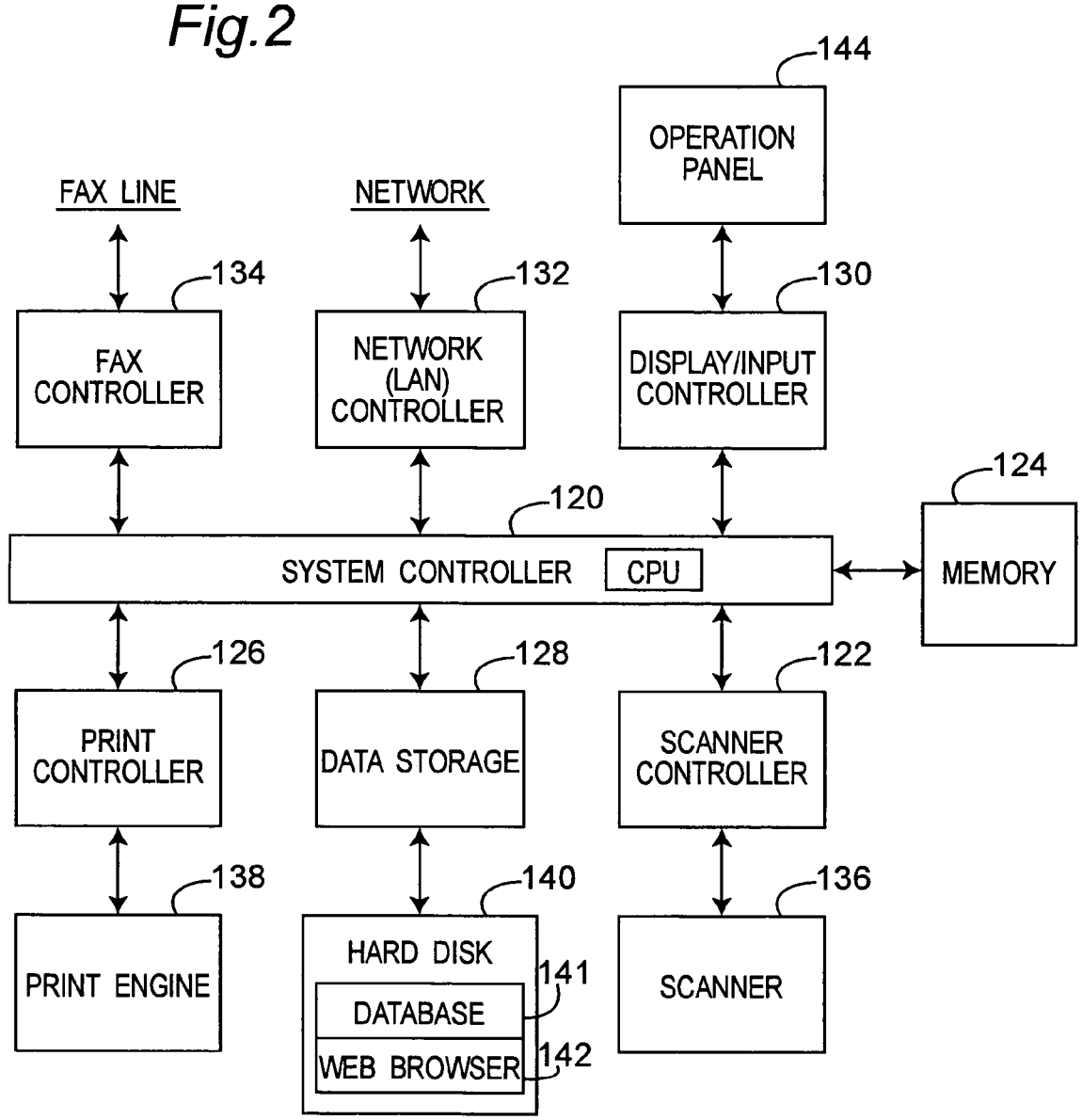
FIG. 2 is a block diagram of a multi-functional peripheral.

FIG. 2 shows a main body of the MPF 105, 106 schematically. A system controller 120 includes a central processing unit (CPU) for controlling the entire MFP. The system controller 120 is connected to a scanner controller 122, a memory device 124, a print controller 126, a data storage controller 128, a display/input controller 130, a network controller 132 and a facsimile controller 134. The scanner controller 122 controls scanning by a scanner 136. The print controller 126 controls a print engine 138 for printing. The data storage controller 128 stores data in a hard disk 140. The facsimile controller 134 sends and receives fax data via a facsimile line. The display/input controller 130 displays various screens and receives data inputted by a user in the screens displayed in an operation panel 144, which is an example of an input device for displaying various screens for inputting data or for showing a retrieval result. The memory device 124 is used as a work area for a processing such as scanning or printing. The network controller 132 controls communication through the network 101 such as a local area network. As will be explained later, the network controller 132 is an example of a transmission device for sending data to a destination in correspondence to a one-touch key or a key for designating a destination by one user's operation in the operation panel 144. The hard disk 140 provided as a storage device stores a database (or a one-touch key database) 141 and a software program for accessing the LDAP server 103 such as a web browser 142. Information including addresses is stored in the database 141.

In this system, the MFP 105, 106 can send document or image data to a client computer 104 or the like as an Internet facsimile or directly as a file attached to an e-mail. On a data transmission, an e-mail address, a facsimile number or the like is inputted directly. However, the e-mail address or the like for transmission can be set by operating a one-touch key when the destination information has been registered to the one-touch key. A one-touch key is an example of a key to which a destination is registered. Though e-mail transmission is explained mainly below, an abbreviated dialing for facsimile transmission is also an example of the key to which a destination is registered.

In the operation panel 144 in the MFP 105, 106, one-touch keys to be operated by a user are displayed in a screen of the operation panel 144. Destination information such as e-mail address can be registered to each of the one-touch keys. On transmission, a user can designate the e-mail address only by touching one of the one-touch keys in the panel 144 to which the address is registered. Then, an e-mail with an attached file can be sent to the designated e-mail address. The data on the one-touch keys are stored in the database 141.

The LDAP server 103 has a database 170 or an destination database to which destinations in the network 101 are registered. A user accesses the LDAP server 103 through the network 101 and instructs retrieval based on retrieval conditions inputted. Then, the LDAP server 103 extracts an address of the destination from the database 103 based on the retrieval conditions. The user may instruct to register the extracted address in the database 141 in the MFP 105, 106. Thus, the database 141 is updated at the latest status. The database 141 of the one-touch keys provided on the panel 140 is stored in the hard disk 140, but alternatively it is stored in a different storage device such as a non-volatile memory in the MFP.

Figure 3:
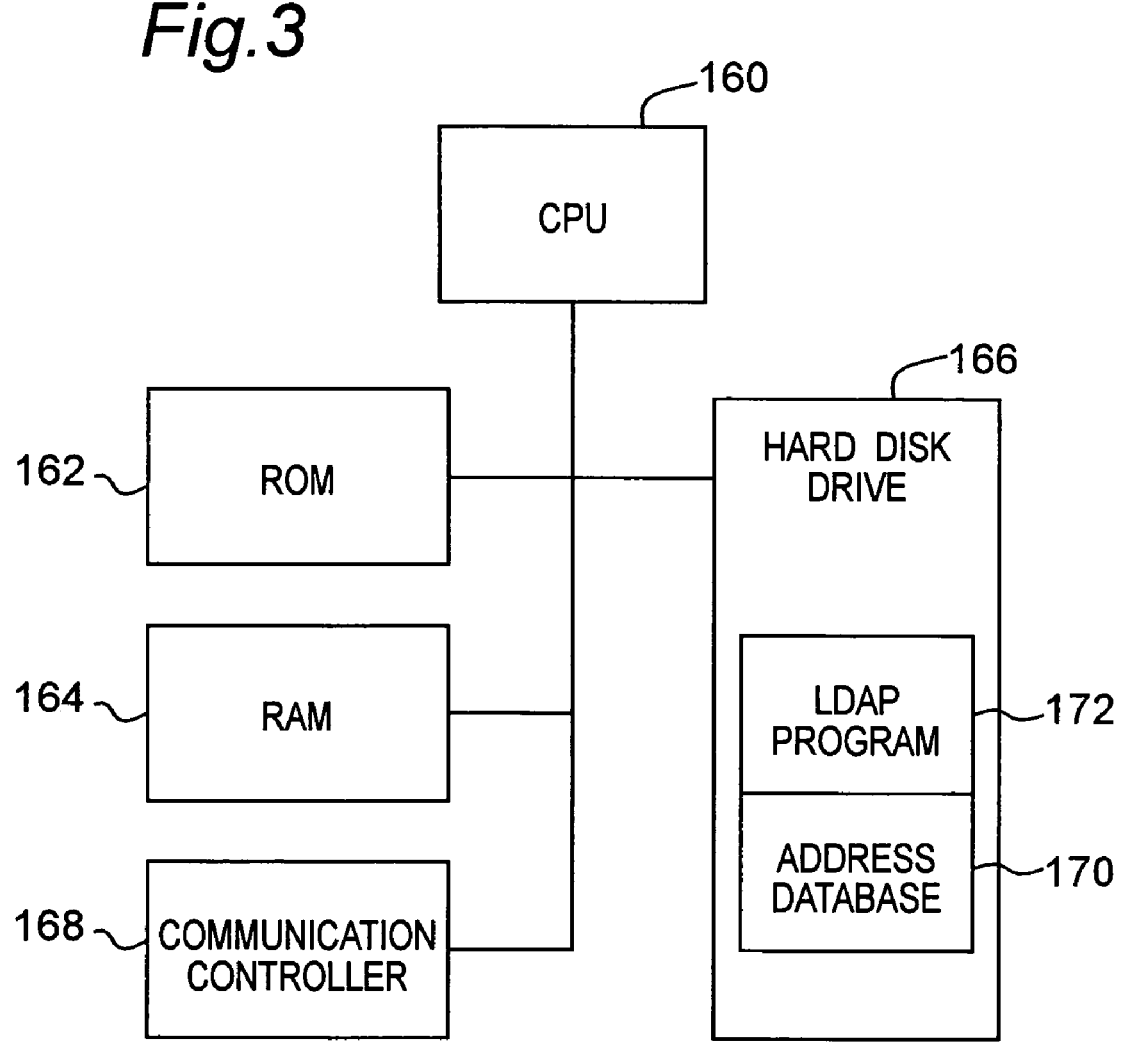
FIG. 3 is a block diagram of an LDAP server.

In the above-mentioned network shown in FIG. 1, a server for registering destinations and a data transmission apparatus for sending data to a destination are connected to the network, and such a system is called as an LDAP retrieval system. FIG. 3 shows a structure of the LDAP server 103 as the server for registering destinations. A central processing unit (CPU) 160 which controls the entire server 103 is connected to a read-only memory (ROM) 162 for storing programs and data, a random access memory (RAM) 164 as a work area, a hard disk drive 166 for storing programs and data, and a communication controller 168 for communication with the external network 101. A hard disk in the hard disk drive 166 stores a database 170 for registering destination information from the external through the network 101 and an LDAP retrieval program 172 for registering and retrieving data in the database 170. LDAP is a protocol for accessing a directory database through a TCP/IP network such as the Internet or an intranet, and a protocol of LDAP is used in LDAP retrieval directory service to denote a service for managing information on e-mail addresses of users in the network and on environment. Such information is retrieved with use of user's name. The LDAP retrieval program 172 is a means for retrieving the registered contents in the database 170. Further, the communication controller 168 is used as a device for sending the retrieved addresses to the data transmission apparatus. Therefore, the LDAP server 103 has a retrieval function (LDAP retrieval program 172) for retrieving the registered contents for the information and a communication controller 168 for sending addresses received from the destination registering server 103 to a data transmission apparatus. On the other hand, as explained above, the MFP 105, 106 or a data transmission apparatus has a storage devices 141 for storing destinations received from the destination registering server 103 in correspondence to a key for designating the address, a display device 142 for displaying a screen for displaying the one-touch keys registered and stored in the storage device 141, and a transmission device 132 for sending data to a destination in correspondence to the selected key.

Figure 4:
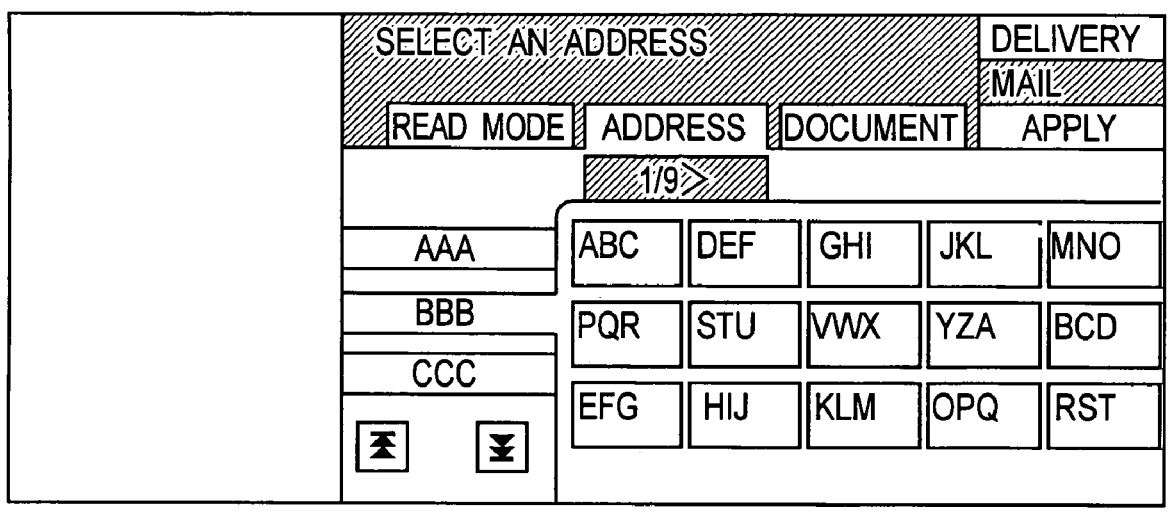
FIG. 4 is a diagram of a window for selecting a one-touch key in an operation panel.

FIG. 4 shows a one-touch key selection screen displayed in the operation panel 144. One-touch keys are displayed, and a destination to which a user wants to transmit data is selected by touching one of the keys. In the example shown in FIG. 4, one-touch keys for a group having a name of "BBB" are displayed, and they have labels such as "ABC" and "DEF". When a user selects and touches one of the keys in the screen, the e-mail address registered in the one-touch key information of the selected key is determined as the destination. For example, "ohata@tdc.abcde.jp" or an e-mail address of a person Ohata is registered to a one-touch key (not shown) having a key name (or label) of "OHATA" which can be recognized by a user. By touching the key, the destination is set to ohata@tdc.abcde.jp. Therefore, when transmission is instructed with the operation panel 162, data can be transmitted to a destination in correspondence to the selected key.

Figure 5:
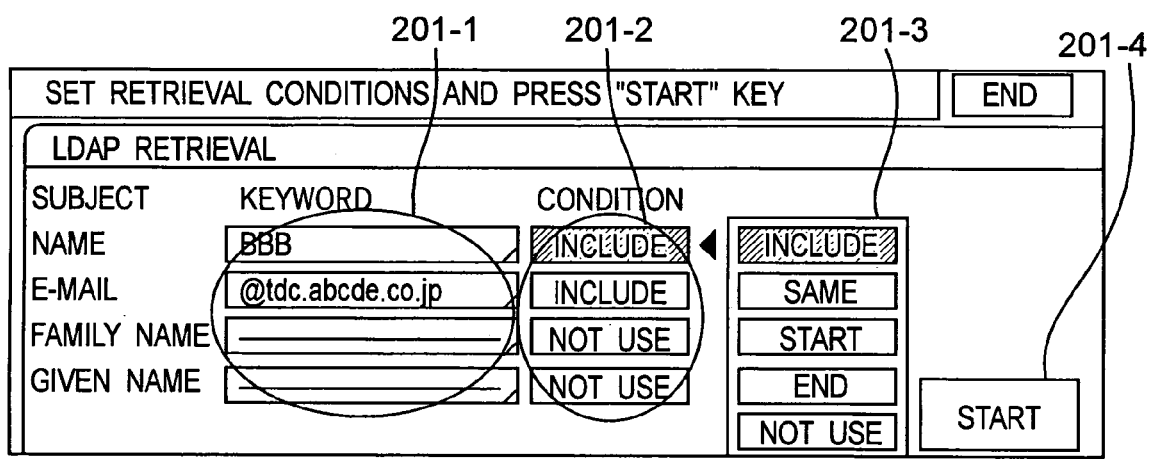
FIG. 5 is a diagram of a window for retrieval in the operation panel.

A user of the MFP 105, 106 or the computer 104 inputs retrieval conditions in a retrieval screen displayed on the operation panel 144 and instructs retrieval to the LDAP server 103. For example, information in the LDAP server 103 is retrieved by using a retrieval condition such as "include", "same", "start" or "end" for a retrieval keyword. Alternatively, AND operation of the retrieval results is used to narrow the information. FIG. 5 shows a retrieval screen displayed on the operation panel 144. Retrieval conditions for the data in the database 170 are set in the screen. The screen displays, from the left to the right, "subject" or subject item to be retrieved, "keyword" 201-1 for each retrieval subject, and "condition" 201-2 as retrieval condition for each keyword which can be set by selecting one of items 201-3 displayed on the screen. In this example, the subjects are "name", "e-mail address", "family name" and "given name". The "name" represents a name of a group to which one-touch keys belong to. Thus, the retrieval subject items include "name" for a set of one-touch keys, and "e-mail address", "family name" and "given name" for each one-touch key. In the screen, keywords and retrieval conditions for the retrieval subject items can be inputted. Further, in the screen, start key 201-4 is provided for instructing start of retrieval by a user. By setting retrieval conditions and pushing the start key 201-4 in the screen, the LDAP server 13 is instructed to start retrieval or to extract destinations from the database 170 based on the retrieval conditions. The result of retrieval received from the LDAP server 103 is displayed on the operation panel 144.

In this embodiment, besides the above-mentioned LDAP retrieval, LDAP retrieval is also performed automatically when a user logs in, only on the destination information such as e-mail addresses for one-touch keys, or keys for registered destination, which a log-in user is likely to use, so that the database 141 is always updated to have the latest destination information. In an MFP having a user authentication system, the system identifies a log-in user. In the user authentication system, a user ID and a password are registered, so that the device is allowed to be used only when a registered user inputs his or her user ID and password. The destination information for a key which a registered user is likely to use is registered in the database 141. For example, when a log-in user registers the destination information to the database 141, the user is related to the one-touch key or the like and is registered as a "registered user" for the key in the database 141. Further, when the log-in user transmits data by using the database, the user is related to the one-touch key or the like and is registered as a "key user" for the key in the database 141. Therefore, when the user logs in, the address information related to the user information is extracted, and the LDAP retrieval is performed based on the destination information, so as to update the destination information. Thus, because the LDAP retrieval is automatically performed when a one-touch key which a user is likely to use is pressed, the time for retrieval is shortened to improve a response of the data transmission apparatus, to decrease the traffic due to retrieval in the network, and to keep the destination information always updated.

In an example, the one-touch information and the user information are separately stored in the database 141 in the storage device. Further, in a user information table in the database 141, a relational data to the one-touch information is embedded in the user information table. When a log-in user stores a destination in the storage device, the user is stored as a registered user related to the one-touch key and the like in the user information table. When a log-in user sends data with use of a one-touch key by using the storage device, the user is registered as a key user related to the one-touch key or the like in the user information table.

Tables 1 and 2 show examples of one-touch information and user information, respectively. As shown in Table 1, the one-touch information includes a key name (label) displayed on a one-touch key, an e-mail address, a facsimile number and a keyword. Further, as shown in Table 2, the user information includes a user identification (ID), a password, a registered key number and a used key number. As mentioned above, when a log-in user stores a destination in the destination storage device, the number of the registered key number (reg. key No.) related to the destination is registered. Further, when a log-in user sends data with a key by using the destination storage device, the number of the used key (used key No.) is registered.

TABLE 1

| One-touch information | | | |
|---|---|---|---|
| No. | 1 | 2 | 3 |
| label of one-touch key | Yoshida | Tanaka | |
| e-mail address | yoshida@km.jp | tanaka@km.jp | |
| fax number | 012-345-6789 | 012-345-7890 | |
| eyword | abc | def | |

TABLE 2

| User information | | | |
|---|---|---|---|
| No. | 1 | 2 | 3 |
| user ID | yoshida | tanaka | aoki |
| password | ******* | ******* | ******* |
| reg key No. | 1 | 2 | 1 |
| used key No. | 1 | 1,2 | |

For example, when a user "aoki" registers one-touch information for No. 1 one-touch key in the one-touch information table (Table 1), 1 is stored as the registered key No. in the user information table (Table 2). When a user "tanaka" registers one-touch information for No. 2 one-touch key in the one-touch information table (Table 1), 2 is stored as the registered key number in the user information table (Table 2). When a user "yoshida" sends data using No. 1 one-touch key, 1 is stored as the used key number in the user information table (Table 2). When a user "tanaka" sends data using No. 2 one-touch key, 2 is stored as the used key number in the user information table (Table 2).

If it is instructed to perform re-retrieval on a registered user(s) and a key user(s) in a state as shown in Tables 1 and 2, when a user logs in, the LDAP retrieval is automatically performed based on the registered key number(s) and used key number(s) in the user information table. For example, when user "aoki" logs in, re-retrieval for the information for No. 1 key is performed. When user "yoshida" logs in, re-retrieval for the information for No. 1 key is performed. When user tanaka" logs in, re-retrieval for the information for No. 1 and 2 keys is performed.

Figure 6:
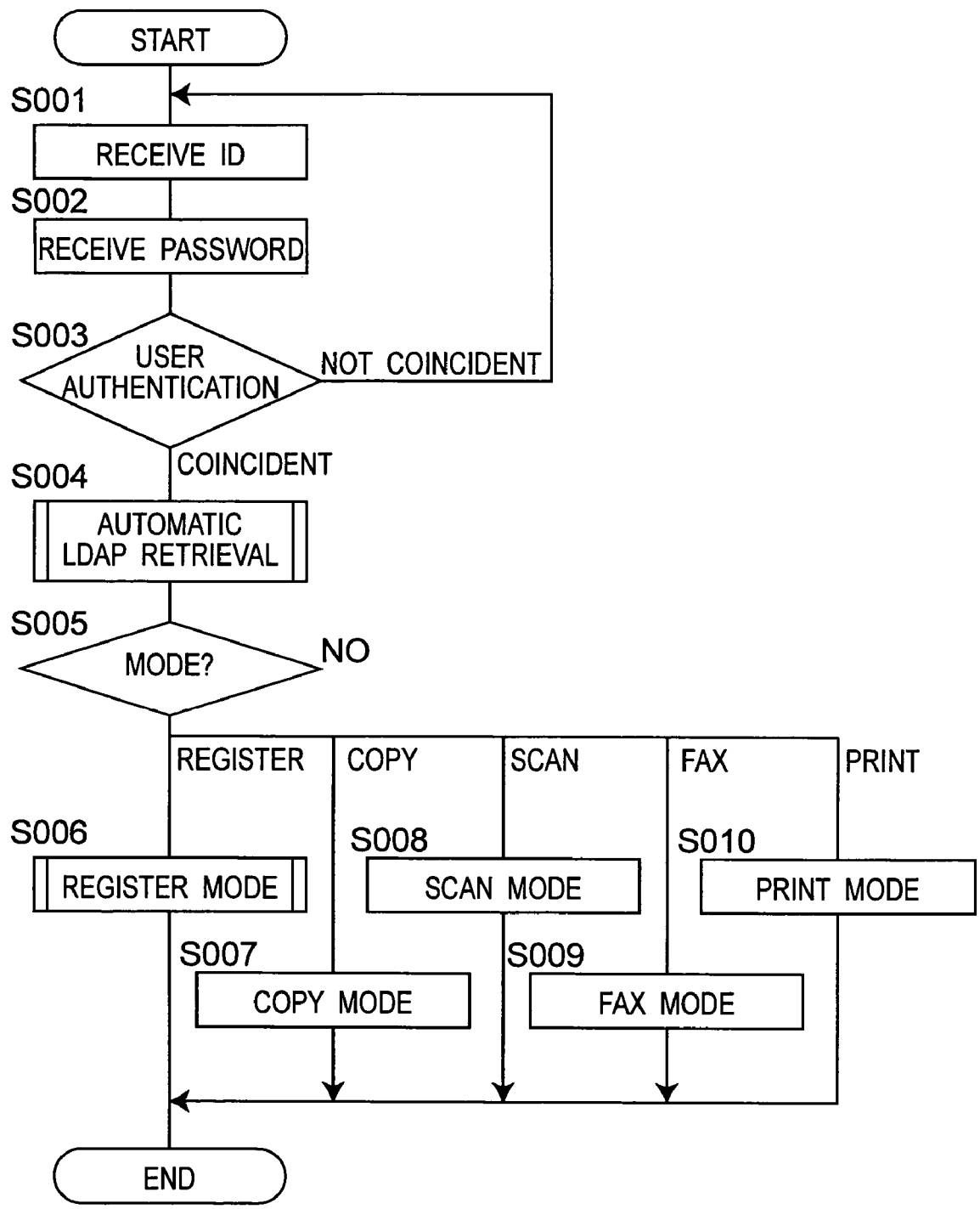
FIG. 6 is a flowchart of a processing in the multi-functional peripheral.

FIG. 6 is a flowchart of a processing in the MFP. First, user ID and password are received (S001 and S002), and user authentication is performed (S003). If the input data agrees with the information registered in the device, the processing proceeds to step S004. Otherwise, the processing returns to step S001. Thus, a log-in user is identified with the user authentication.

Figure 7:
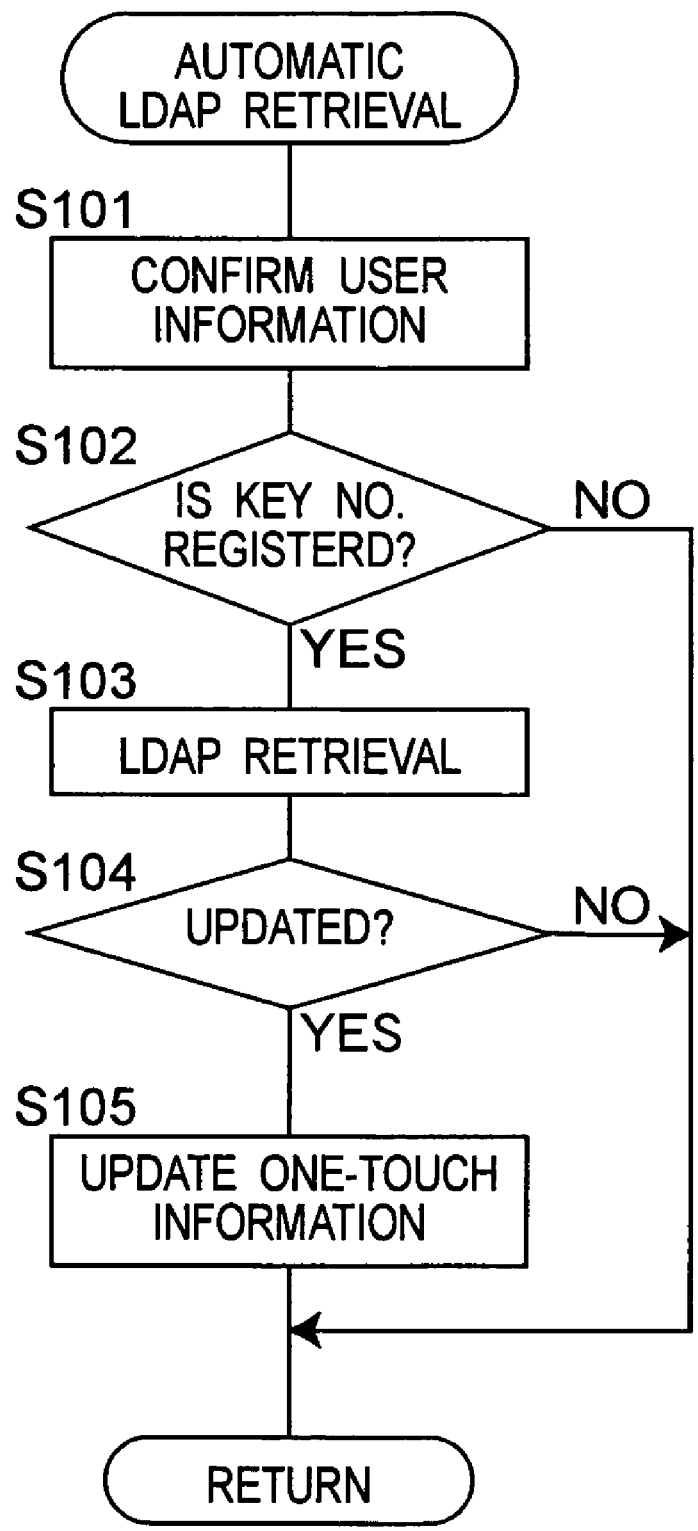
FIG. 7 is a flowchart of a processing for automatic LDAP retrieval.

Next, the automatic LDAP retrieval that is a feature of the embodiment is performed (S004, refer to FIG. 7). The LDAP retrieval is performed automatically on destination information such as an e-mail address of a destination register key such as one-touch key which a log-in user is likely to use, so as to keep the database 141 always updated for the latest address information.

Next, the processing branches according to a mode selected by the user (S005), so that various setting or operation is performed according to the selected mode (S006 to S010). For example, in register mode the processing therefor is performed (S006, refer to FIG. 8), in copy mode the processing therefor is performed (S007), in scan mode the processing therefor is performed (S008), in facsimile mode the processing therefor is performed (S009), and in print mode the processing therefor is performed (S010).

FIG. 7 is a flowchart of the processing for the automatic LDAP retrieval (S004). First, user information of the log-in user is confirmed (S101), If the key number such as a registered key number or a used key number in the user information is registered in the database 141 (YES at S102), LDAP retrieval is performed on the one-touch information in correspondence to the key number (S103). When the result of retrieval is updated (YES at S104), the one-touch information such as e-mail address is updated based on the information (S105).

Figure 8:
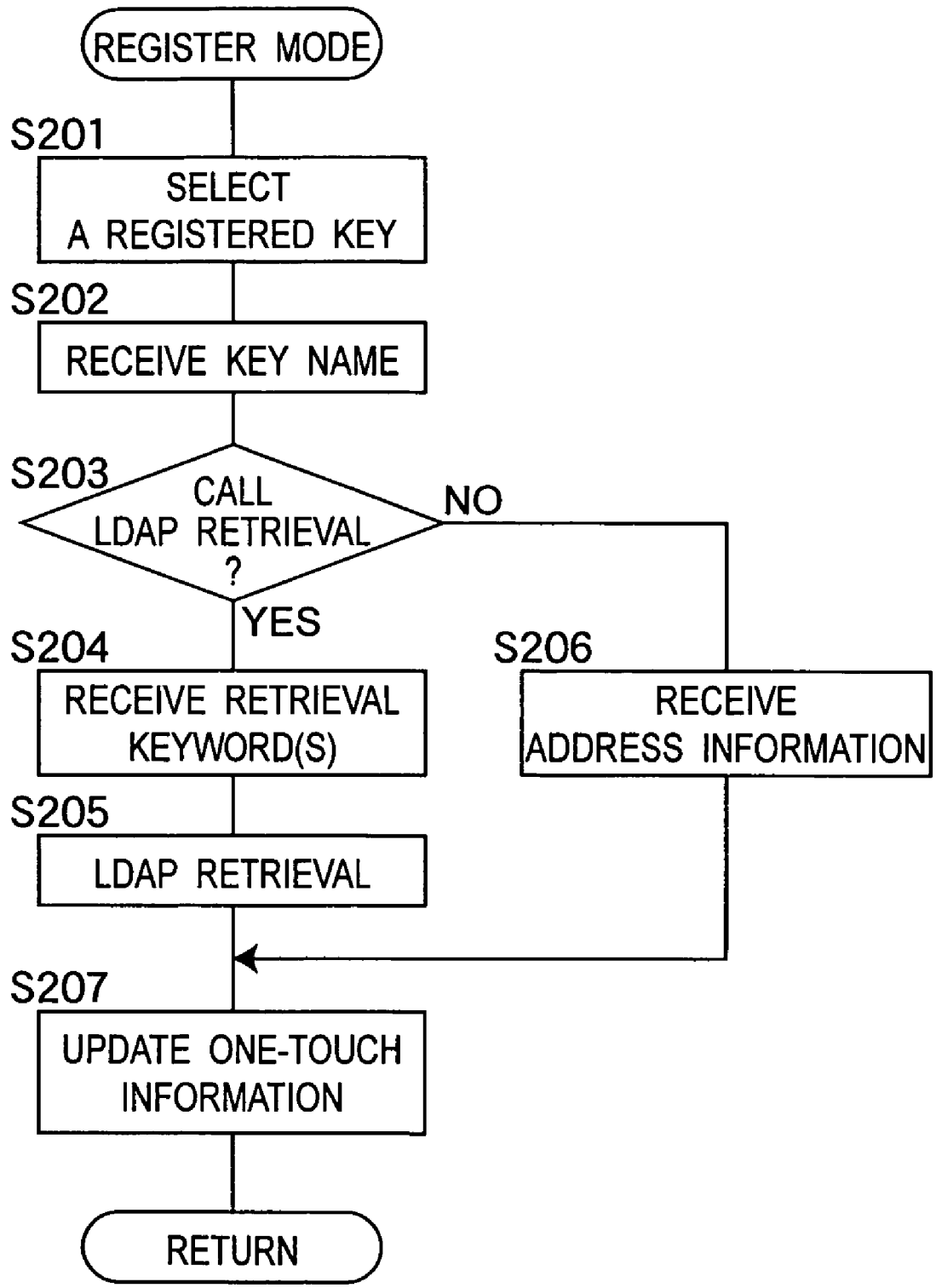
FIG. 8 is a flowchart of a processing for register mode.

FIG. 8 is a flowchart of the processing for register mode (S006) wherein a one-touch key is registered according to user's input data. First, user's input for registering a selected one-touch key is received (S201), and a name of the selected one-touch key is received (S202). Next, user's instruction to perform LDAP retrieval or not is received (S203). When it is instructed- to perform LDAP retrieval (YES at S203), retrieval keywords are received for performing the LDAP retrieval (S204), and the LDAP retrieval is performed by the LDAP server. Then, the result of the LDAP retrieval is registered (S207). On the other hand, when it is not instructed to perform LDAP retrieval, that is, when address information is inputted directly by the user, it is received (S206) and registered (S207).

In another example, the registered users and the key users are managed as a whole, as shown in Table 3. That is, the key information and the user information are stored in a single table.

TABLE 3

One-touch and user information

| No. | 1 | 2 | 3 |
|---|---|---|---|
| label on one-touch key | Yoshida | Tanaka | |
| e-mail address | yoshida@km.jp | tanaka@km.jp | |
| fax number | 012-345-6789 | 012-345-7890 | |
| reg User ID | Aoki | tanaka | |
| key user ID | Yoshida | tanaka | |
| key user ID | Tanaka | | |
| key user ID | | | |

Table 3 shows an example wherein registered users and key users are registered in the one-touch key information. For example, when user "aoki" registers one-touch information for No. 1 one-touch key, "aoki" is registered as registered user. When user "tanaka" registers one-touch information for No. 2 one-touch key, "tanaka" is registered as registered user. When user "yoshida" sends data using No. 1 one-touch key, "yoshida" is registered as key user for No. 1 key. When user "tanaka" sends data using No. 1 one-touch key, "tanaka" is registered as key user for No. 1 key. When user "tanaka" sends data using No. 2 one-touch key, "tanaka" is registered as key user for No. 2 one-touch key.

If it is set that re-retrieval is performed on a registered user or users and a key user or users, when a user logs in in the state as shown in Table 3, registered users and key users are retrieved, and re-retrieval is performed on the key to which user ID agrees. For example, when user "aoki" logs in, re-retrieval is performed for the information for No. 1 one-touch key. When user "yoshida" logs in, re-retrieval is performed for No. 1 one-touch key. When user tanaka" logs in, re-retrieval for No. 1 and 2 one-touch keys is performed.

Further, in a modified embodiment only key users are managed, but a similar advantage is obtained. When a log-in user sends data using the storage device which stores destination information, the user is registered as a key user related to the one-touch key and the like in the database 141. In this case, the registered number is not stored in the user information table.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A data transmission apparatus comprising:
a transmission device which transmits data to a destination when a user's instruction for data transmission is received;
an input device with which a user designates the destination;
a storage device which stores user information wherein destinations are related to users and the input device; and
an automatic retrieval device which, requests a server to retrieve the destinations related to a user and the input device in the user information in said storage device in response to the user logging in, the server being able to communicate with the data transmission apparatus and having destination information, the automatic retrieval device receives a result of retrieval executed by the server and stores the result in said storage device.

2. The data transmission apparatus according to claim 1, wherein when the user's instruction of data transmission is received, the transmission device makes said storage device store the destination of the transmission in relation to the user and the input device in the user information.

3. The data transmission apparatus according to claim 1, wherein said input device comprises a key to be operated by a user for designating a destination, the key being related to the destination, and said storage device stores key information which relates the destination to the key, and user information which relates the user to the key information.

4. The data transmission apparatus according to claim 3, further comprising a register device which registers a destination to be related with the key for designating a destination in said input device, wherein said register device stores the registered destination in relation to the registered user in the key information in said storage device.

5. The data transmission apparatus according to claim 3, wherein said storage device stores the key information and the user information separately in two tables.

6. The data transmission apparatus according to claim 3, wherein said storage device stores the key information and the user information in a table.

7. The data transmission apparatus according to claim 3, wherein the key for designating a destination is a one-touch key for setting the destination by one user's operation, and the destination information includes an e-mail address.

8. The data transmission apparatus according to claim 1, further comprising a device which authenticates a log-in user to identify the log-in user.

9. A method for data transmission for a data transmission apparatus connected to a server for storing and retrieving destination information, comprising the steps of:
requesting the server, in response to a user logging in the data transmission apparatus, to retrieve the destination information on a destination stored in the storage device in relation to the user and an input device; and
receiving and storing a result of the retrieval from the server.

10. The method according to claim 9, further comprising the step of storing the destination of the data transmission in relation to the user and the input device when the user's instruction of data transmission is received.

11. The method according to claim 9, further comprising the steps of:
receiving an input of a destination designated by a user via the input device;
registering the destination to a key of the input device for designating a destination provided in the data transmission apparatus; and
storing the registered destination in relation to the registered user in the storage device.

12. The method according to claim 9, wherein information on the destination and a key of the input device and information on the destination and the user are stored in two tables separately.

13. The method according to claim 9, wherein information on the destination and a key of the input device and information on the destination and the user are stored in a table.

14. The method according to claim 9, further comprising the step of authenticating a log-in user to identify the log-in user.

15. The method according to claim 9, wherein a key of the input device for designating a destination is a one-touch key for setting the destination by one user's operation, and the destination information includes an e-mail address.

16. A data transmission system comprising:
a server which stores and retrieves destination information; and
a data transmission apparatus connected through a network to said server and sending data to a destination according to a user's instruction;
wherein said server comprises:
a database to which information including destinations is registered;
a retrieval device which retrieves the information according to retrieval conditions; and
a communication device which sends a result of the retrieval obtained by said retrieval device to said data transmission apparatus;
wherein said data transmission apparatus comprises:
a transmission device which transmits data to a destination when a user's instruction for data transmission is received;
an input device with which a user inputs the destination;
a storage device which stores user information wherein destinations are related to users and to the input device; and
an automatic retrieval device which requests a server to retrieve the destinations related to a user and to the input device in the user information in said storage device in response to the user logging in, the automatic retrieval device receiving a result of retrieval executed by the server and stores the result in said storage device.

17. The data transmission system according to claim 16, wherein when the user's instruction of transmission is received by said transmission device, said transmission device makes the storage device store the destination of the transmission in relation to the user and the input device in the user information.

18. The data transmission system according to claim 16, wherein said input device comprises a key for designating a destination, the key being related to the destination, and said storage device stores key information which relates the destination to the key, and user information which relates the user to the key information.

19. The data transmission system according to claim 18, further comprising a register device which registers a destination to the key for designating a destination provided in said input device, wherein said storage device stores the registered destination in the key information in relation to the registered user in said storage device.

* * * * *